(12) United States Patent
Jiao et al.

(10) Patent No.: US 11,676,236 B2
(45) Date of Patent: Jun. 13, 2023

(54) SYSTEMS AND METHODS FOR AUTONOMOUS PASSENGER TRANSPORT

(71) Applicant: Pony AI Inc.

(72) Inventors: Jialin Jiao, South San Francisco, CA (US); Jing Zhai, Fremont, CA (US); Xiang Yu, Santa Clara, CA (US)

(73) Assignee: Pony AI Inc., Grand Cayman (KY)

( * ) Notice: Subject to any disclaimer, the term of this patent is extended or adjusted under 35 U.S.C. 154(b) by 698 days.

(21) Appl. No.: 16/518,812

(22) Filed: Jul. 22, 2019

(65) Prior Publication Data

US 2021/0027410 A1    Jan. 28, 2021

(51) Int. Cl.
*G06Q 50/30* (2012.01)
*G05D 1/00* (2006.01)
*G01C 21/34* (2006.01)
*G06Q 20/40* (2012.01)
*G06V 40/20* (2022.01)
*H04L 67/12* (2022.01)

(52) U.S. Cl.
CPC ......... *G06Q 50/30* (2013.01); *G01C 21/3438* (2013.01); *G05D 1/0088* (2013.01); *G06Q 20/40145* (2013.01); *G06V 40/20* (2022.01); *G05D 2201/0212* (2013.01); *G05D 2201/0213* (2013.01); *H04L 67/12* (2013.01)

(58) Field of Classification Search
CPC ............. G06Q 50/30; G06Q 20/40145; G06Q 20/145; G01C 21/3438; G01C 21/3617; G01C 21/362; G01C 21/3623; G05D 1/0088; G06V 40/20; G06V 40/113
USPC ........................................................... 701/23
See application file for complete search history.

(56) References Cited

U.S. PATENT DOCUMENTS

| | | | |
|---|---|---|---|
| 10,082,793 B1 | 9/2018 | Glaser | |
| 10,088,846 B2 * | 10/2018 | Gao | G06V 20/588 |
| 10,169,934 B2 * | 1/2019 | Diehl | G01C 21/3461 |
| 10,365,783 B2 * | 7/2019 | Bowden | G01C 21/3664 |
| 11,222,214 B2 * | 1/2022 | To | G06V 40/10 |
| 11,402,227 B2 * | 8/2022 | Engle | B60W 60/0013 |
| 11,535,264 B2 * | 12/2022 | Enthaler | G06V 40/28 |
| 2017/0153714 A1 * | 6/2017 | Gao | G01C 21/34 |
| 2017/0213403 A1 * | 7/2017 | Diehl | G07C 9/27 |
| 2018/0126871 A1 | 5/2018 | Martinotti et al. | |
| 2019/0106021 A1 | 4/2019 | Dietrich et al. | |
| 2019/0119970 A1 | 4/2019 | Erlacher et al. | |
| 2019/0204992 A1 * | 7/2019 | Bowden | G01C 21/3438 |
| 2019/0263422 A1 * | 8/2019 | Enthaler | G06V 40/19 |
| 2019/0315342 A1 | 10/2019 | Bertollini et al. | |
| 2020/0056901 A1 * | 2/2020 | Engle | G01C 21/3446 |
| 2020/0202142 A1 * | 6/2020 | To | G06V 40/28 |
| 2020/0286003 A1 * | 9/2020 | Nagarajan | G06Q 10/02 |
| 2020/0380533 A1 * | 12/2020 | Lines | G01C 21/3438 |
| 2021/0074155 A1 * | 3/2021 | Lassoued | G05D 1/0094 |

\* cited by examiner

*Primary Examiner* — Krishnan Ramesh

(57) ABSTRACT

Vehicles, methods, and computer readable storage media are provided for providing transportation of a gesturing pedestrian by an autonomous vehicle. The vehicle can be operated by identifying that an individual is interested in receiving a transportation. A second vehicle can then receive information about the individual that is interested in receiving the transportation. The first vehicle is then informed regarding the second vehicle.

20 Claims, 12 Drawing Sheets

SYSTEMS AND METHODS FOR AUTONOMOUS PASSENGER TRANSPORT

FIELD

This disclosure relates to an autonomous passenger transport methods and systems.

BACKGROUND

The current method of hailing vehicle transportation through electronic means with a mobile device is cumbersome and inefficient, requiring the passenger and driver to "find" each other. Hailing a vehicle through electronic means also requires that an individual use a device to hail the vehicle, which tethers the individual to the electronic device. Moreover, the electronic device may lose battery power, which can leave a passenger stranded. In an increasingly digital world, the need to carry an electronic device is an increasing necessity. To free the individual from the burden of carrying an electronic device, there is a need for a way of hailing a vehicle electronically without an electronic device.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing transportation, the method includes: identifying, by a sensor that an individual is interested in receiving transportation. The method also includes receiving, by a first vehicle, information about the individual that is interested in receiving the transportation. The method also includes navigating the first vehicle to receive the individual into the first vehicle. Other embodiments of this aspect include corresponding computer systems, apparatus, and computer programs recorded on one or more computer storage devices, each configured to perform the actions of the methods.

Implementations may include one or more of the following features. The method where the sensor that identified the individual is located on a second vehicle. The method may also include further including informing the individual, by a second vehicle, that the first vehicle is on its way by providing an estimated time to the individual. The method where identifying the individual with the sensor further includes receiving a hailing communication from the individual. The method may also further include determining a destination responsive to receiving input from the individual. The method may also include further including operating the first vehicle autonomously to the destination. The method where the hailing communication by the individual further includes at least one of a physical gesture, a voice communication, or standing on a curb. The method where the hailing communication indicates a type of vehicle that the individual is requesting the transportation. A method further includes: identifying a payment account of the individual based on the identity of the individual. The method may also include charging the payment account for the transportation of the individual. The method further including authenticating the individual for the payment account by receiving biometric information from the individual. Implementations of the described techniques may include hardware, a method or process, or computer software on a computer-accessible medium.

One general aspect includes an apparatus for providing transportation, the apparatus including: a sensor configured to identify an individual interested in receiving transportation. The apparatus also includes a first vehicle configured to receive information about the individual interested in receiving transportation and navigate to receive the individual into the first vehicle. Other embodiments of this aspect include corresponding computer systems, apparatus, and computer programs recorded on one or more computer storage devices, each configured to perform the actions of the methods.

Implementations may include one or more of the following features. The apparatus where the sensor that identified the individual is located on a second vehicle. The apparatus may also include where the second vehicle is configured to inform the individual that the first vehicle is on its way by providing an estimated time to the individual. The apparatus where identifying the individual with the sensor further includes receiving a hailing communication from the individual. The apparatus may also include where the first vehicle is further configured to determine a destination responsive to receiving input from the individual and operate autonomously to the destination. The apparatus where the hailing communication includes at least one of a physical gesture, a voice communication, or standing on a curb. The apparatus where the hailing communication indicates a type of vehicle that the individual is interested in. The apparatus where the first vehicle is further configured to identify a payment account of the individual based on an identity of the individual; and charge the payment account for the transportation of the individual. The apparatus where the first vehicle is further configured to authenticate the individual for the payment account by receiving biometric information from the individual. Implementations of the described techniques may include hardware, a method or process, or computer software on a computer-accessible medium.

One general aspect includes a computer readable storage medium in a first vehicle having data stored therein representing software executable by a computer, the software including instructions that, when executed, cause the first vehicle to perform: identifying, by a sensor that an individual is interested in receiving transportation. The computer readable storage medium also includes receiving, by the first vehicle, information about the individual that is interested in receiving the transportation. The computer readable storage medium also includes navigating the first vehicle to receive the individual into the first vehicle. Other embodiments of this aspect include corresponding computer systems, apparatus, and computer programs recorded on one or more computer storage devices, each configured to perform the actions of the methods.

Implementations may include one or more of the following features. The computer readable storage medium in the vehicle where the sensor that identified the individual is located on a second vehicle. The computer readable storage medium may also include further including informing the individual, by a second vehicle, that the first vehicle is on its way by providing an estimated time to the individual. The computer readable storage medium in the first vehicle where identifying the individual with the sensor further includes a hailing communication from the individual. The computer-readable storage medium in the first vehicle where the hailing communication includes at least one of: a physical gesture, a voice communication, or standing on a curb. The computer-readable storage medium in the vehicle further including: identifying a payment account of the individual based on the identity of the individual. The computer-readable storage medium may also include charging the payment account for the transportation of the individual. The computer-readable storage medium in the vehicle further including authenticating the individual for the payment account by receiving biometric information from the individual. Implementations of the described techniques may include hardware, a method or process, or computer software on a computer-accessible medium.

The present disclosure includes methods for operating an automated vehicle. In an exemplary embodiment, a method includes identifying, by a sensor located on a first vehicle that an individual is interested in receiving a transportation. The method includes receiving, by a second vehicle, information about the individual that is interested in receiving the transportation. The method then includes informing the first vehicle information regarding the second vehicle. The method may further include navigating, the second vehicle, to the individual. The method includes detecting, by the second vehicle, that the individual has entered the second vehicle. The method then includes identifying, by the second vehicle, a destination responsive to receiving input from the individual and then operating the second vehicle autonomously to the destination. Identifying the individual with the sensor may further include a hailing communication from the individual. The hailing communication may further include at least one of: a physical gesture, a voice communication, or standing on a curb. The hailing communication may further indicate a type of vehicle that the individual is interested in. The method may further include informing the individual, by the first vehicle, that the second vehicle is on the way. The method may further include identifying the individual, by the second vehicle and identifying an account based on the identity of the individual and then charging the account for the transportation of the individual.

In an exemplary embodiment, a first vehicle includes a sensor configured to identify an individual interested in receiving a transportation. A second vehicle is configured to receive information about the individual interested in receiving the transportation. The first vehicle is configured to receive information regarding the second vehicle. The second vehicle may be further configured to navigate to the individual and to detect that the individual has entered the second vehicle. The second vehicle may be further configured to identify a destination responsive to receiving input from the individual and operate autonomously to the destination. The sensor may be further configured to identify a hailing communication from the individual. The hailing communication may include at least one of: a physical gesture, a voice communication, or standing on a curb. The hailing communication may further include a type of vehicle that the individual is interested in. The first vehicle may be further configured to inform the individual that the second vehicle is on the way. The second vehicle may be further configured to identify the individual, identify an account based on the identity of the individual, and then charge the account for the transportation of the individual.

Another general aspect is a computer readable storage medium in a vehicle having data stored therein representing software executable by a computer. The software in the computer includes instructions that, when executed, cause the vehicle to identify by a sensor located on a first vehicle that an individual is interested in receiving transportation. A second vehicle receives information about the individual that is interested in receiving transportation. The first vehicle is then informed regarding the second vehicle. The computer may further include navigating the second vehicle to the individual and then detecting, by the second vehicle, that the individual has entered the second vehicle. The second vehicle may then identify a destination responsive to receiving input from the individual and operate the second vehicle autonomously to the destination. The computer may further include identifying, with the sensor, a hailing communication from the individual. The hailing communication may further include at least one of: a physical gesture, a voice communication, or standing on a curb. The hailing communication may further indicate a type of vehicle that the individual is interested in. The computer may further include identifying the individual, by the second vehicle, identifying an account based on the identity of the individual, and charging the account for the transportation of the individual.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the present disclosure are utilized, and the accompanying drawings of which:

DETAILED DESCRIPTION

The disclosed subject matter describes a device-free method and system for the transportation of a gesturing pedestrian in a vehicle that may be autonomous. The autonomous vehicle may use computer vision to identify prospective passengers. The vehicle may first distinguish between pedestrians and other objects such as an animal, light post, car, or drones. The vehicle may then determine whether the pedestrian is interested in a ride by analyzing image data of the pedestrian. The image data may show that the pedestrian is performing an action such as but not limited to, standing, walking, standing by a curb waving, looking in a direction, using a preapproved gesture, or other body language data as well as the amount of time a pedestrian engages in the action. Once the computer initially recognizes that the pedestrian is a prospective passenger, the computer determines a closest available autonomous vehicle to the recognized passenger. The closest available autonomous vehicle will confirm that the recognized passenger wants a ride and allows the passenger to board the autonomous vehicle. One way of confirming that the passenger wants a ride is that the passenger opens the door of the autonomous vehicle. The autonomous vehicle can then accept payment from the passenger. Payment may be made without a card such as through identifying the passenger and linking the passenger identity to an account. The identification can be through face detection, voice detection, fingerprint, password recognition, or otherwise. The autonomous vehicle may then receive authorization for payment from the passenger in any number of ways including, vocally, a nod of head, and pushing a button inside the autonomous vehicle. The autonomous vehicle can then receive location information from the passenger and transport the passenger to the location. The passenger may relay the location information to the vehicle in many ways including, but not limited to vocally speaking to a microphone in the vehicle, using a console in the vehicle, or pointing in a direction.

Figure 1:
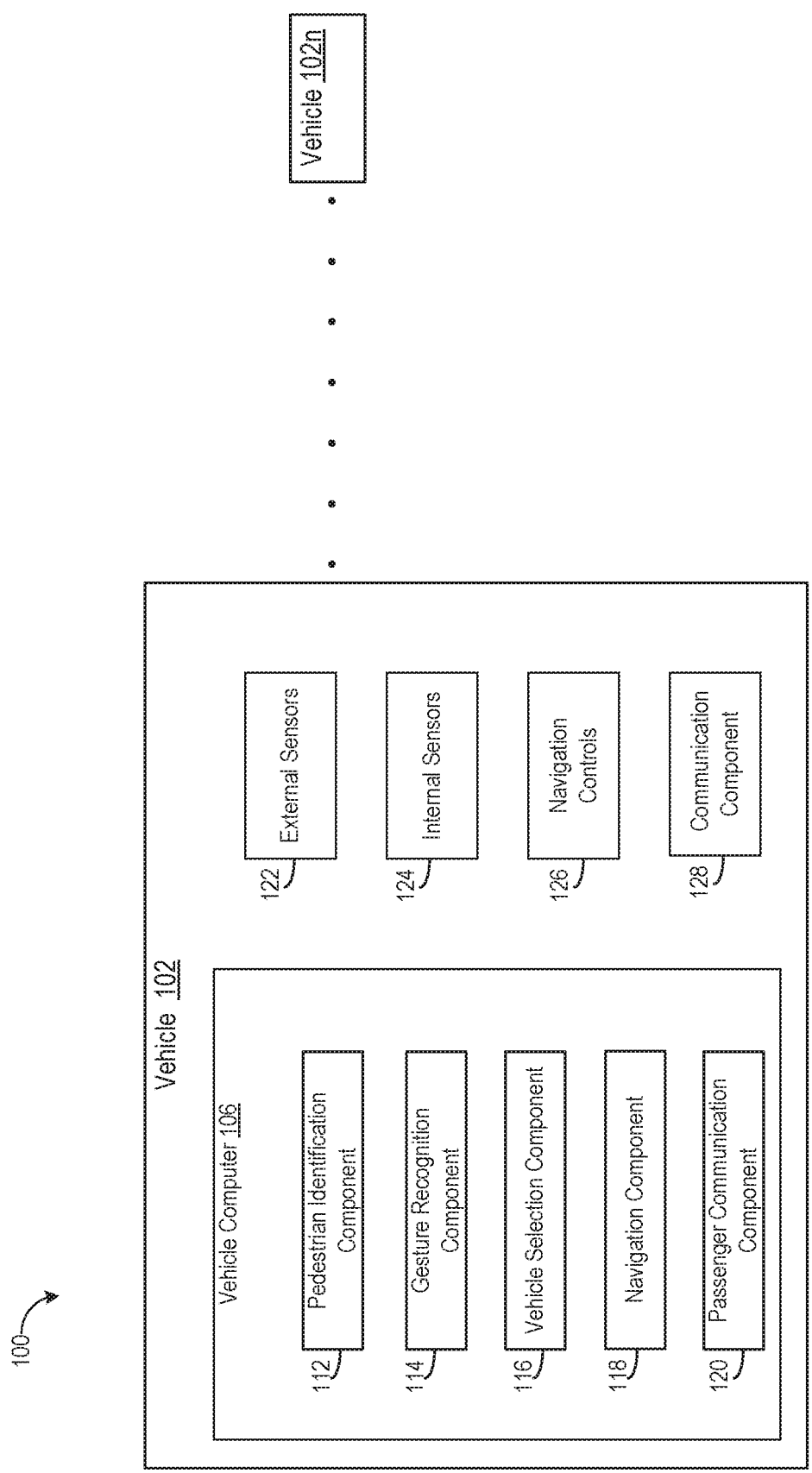
FIG. 1 is a schematic diagram illustrating the components that may be used in an autonomous passenger transport system in the described implementation.

Referring to FIG. 1, FIG. 1 shows a schematic of the autonomous passenger transport system 100. The autonomous passenger transport system 100 includes a vehicle 102 and other vehicles 102n. Both the vehicle 102 and the other vehicles 102n referenced herein are comprised of the same components and parts. Other vehicles 102n may be referenced where one vehicle 102 communicates with one or more other vehicles 102n. In this embodiment, the vehicle 102 comprises a vehicle computer 106, external sensors 122, internal sensors 124, navigation controls 126, and a communication component 128. The autonomous passenger transport system 100 includes a plurality of vehicles as shown by vehicle 102 and other vehicles 102n. The vehicle 102 may be any form of transportation designed to transport one or more human passengers. Transportation, in the present disclosure, is the carrying of one or more human passengers. The transportation may comprise carrying the one or more human passengers from one location to another location. Possible examples of the vehicle 102 are cars, trucks, buses, motorcycles, scooters, hoverboards, and trains.

The vehicle computer 106 may be a computer with a processor, memory, and storage, that is capable of receiving data from the vehicle 102 and sending instructions to the vehicle 102. The vehicle computer 102 may be a single computer system, may be co-located, or located on a cloud-based computer system. The vehicle computer 106 may be placed within the vehicle 102 or may be in a separate location from the vehicle 102 and in communication with the vehicle 102. In some embodiments, more than one vehicle 102 share the vehicle computer 106. The vehicle computer 106 identifies pedestrians, recognizes potential passenger gestures, selects which vehicle 102 to pick up the passengers, navigates to the passengers, and interprets passenger communication. The vehicle computer 106 includes a pedestrian identification component 112, a gesture recognition component 114, a vehicle selection component 116, a navigation component 118, and a passenger communication component 120.

The pedestrian identification component 112 of the vehicle computer 106 scans the images of the objects captured by external sensors 122 to identify one or more pedestrians on the road. The pedestrian identification component 112 may be a computer with a processor, memory, and storage. The pedestrian identification component 112 may share a processor, memory, and storage with the vehicle computer 106 or may comprise a separate computing system. The pedestrian identification component 112 identifies pedestrians by differentiating humans from other objects. By identifying humans from other objects, the pedestrian identification component 112 reduces the workload of the gesture recognition component 114 by limiting the objects that the gesture recognition component 114 analyzes to just humans.

Once pedestrians on the road are identified by the pedestrian identification component 112, potential passengers are picked out from the identified pedestrians by the gesture recognition component 114. The gesture recognition component 114 may be a computer with a processor, memory, and storage. The gesture recognition component 114 may share a processor, memory, and storage with the vehicle computer 106 or may comprise a separate computing system. The gesture recognition component 114 determines if an individual is making a hailing communication at the vehicle 102. The hailing communication may be visual or audio or a combination of visual and audio output generated by the individual seeking transportation. A visual hailing communication may be a gesture that indicates that the individual is interested in receiving transportation. There are many gestures that may indicate that the individual is making a hailing communication. In one example of a gesture shown in FIG. 9, the individual 930 is the universal hailing gesture with one or more hands higher than their head. Other gestures may be more subtle, and some gestures may vary by location. The gesture recognition component 114 takes still images and moving images to determine the body position and body movements of the individual. Any number of factors and variables may be used to determine that the gesture is a hailing communication. Additionally, some gestures may indicate the type of vehicle 102 desired by the individual. For example, displaying one, two, or three fingers to the vehicle may indicate three different types of vehicles 102 that interests the individual. Vehicle types may be compact, luxury, sport utility vehicle (SUV), coupe, and minivan. Audio hailing communications can also indicate that an individual is interested in receiving a transportation in a vehicle 102. Saying, "I need a ride" and yelling, "Hey" at a vehicle 102 may be hailing communications. In some embodiments, the gesture may be provided via a mobile device like a wearable device or a mobile device such as a phone.

The vehicle selection component 116 identifies the vehicle 102 that will pick up the potential passenger. The vehicle selection component 116 may be a computer with a processor, memory, and storage. The vehicle selection component 116 may share a processor, memory, and storage with the vehicle computer 106 or may comprise a separate computing system. A first vehicle that identifies a potential passenger transmits the passenger information and the vehicle information. Other vehicles 102 may then navigate to and pick up the potential passenger. In other embodiments, the vehicle 102 that detected the passenger may pick up the passenger. The vehicle selection component 116 selects which vehicle 102 that will pick up the potential passenger. The vehicle selection component 116 may be on any vehicle 102 or in a computer that is not in a vehicle 102. The vehicle selection component 116 may use any criteria for identifying the vehicle that will pick up the potential passenger.

The navigation component 118 interprets data from external sensors 122 to operate the navigation controls 126 of the vehicle 102 and from location to location. The navigation component 118 may be a computer with a processor, memory, and storage. The navigation component 118 may share a processor, memory, and storage with the vehicle computer 106 or may comprise a separate computing system. The navigation component 118 determines location, observes road conditions, finds obstacles, reads signage, determines relative positioning to other vehicles or moving objects, and interprets any other relevant events occurring external to the vehicle 102.

The passenger communication component 120 communicates with passengers to verify passenger identity, learn desired locations of passengers, facilitate and verify passenger payment, and verify that passengers want a ride in the autonomous vehicle. The passenger communication component 120 may be a computer with a processor, memory, and storage. The passenger communication component 120 may share a processor, memory, and storage with the vehicle computer 106 or may comprise a separate computing system. In one embodiment, the passenger communication component 120 can recognize human speech and identify a destination by listening to the passenger speak an address. In an exemplary embodiment, the passenger communication component 120 may analyze the face of an individual to determine the identity of the individual for the purpose of debiting the account of the individual. Also, in an exemplary embodiment, the passenger communication component 120 analyzes visual images of the passenger to ascertain if the passenger is nodding approval to debit the account of the passenger. In other embodiments, the passenger communication component 120 may receive biometric information from the passenger, such as but not limited to, fingerprint, retinal scan, voice, facial image, 3d facial image. Based on the biometric information received from the passenger, the passenger communication component 120 may contact a cloud-based identification computer that may identify a payment account that belongs to the passenger. In some embodiments, the passenger communication component 120 may request that the passenger select from one or more payment accounts of the passenger.

The external sensors 122 gather data from the environment outside the vehicle 102. External sensor data may be used by the navigation component 118 to navigate the vehicle 102. Data collected by the external sensors 122 may also be used by the pedestrian identification component 112 and the gesture recognition component 114 to identify potential passengers. External sensors 122 may be in the vehicle 102 (see FIG. 2) or may be outside the vehicle 102, whereby external sensor 122 data maybe transmitted to the vehicle 102.

Internal sensors 124 gather data from inside the vehicle 102. Internal sensor 124 data may be used to monitor passengers and facilitate interactions with the passengers. In an exemplary embodiment, internal sensor 124 data are used to determine the location that a passenger wishes to be transported. Also, in an exemplary embodiment, internal sensor 124, is used to identify a passenger through facial identification and link the passenger identity to an account, which can be debited for the transportation provide by the vehicle 102 which may be taxi.

Navigation controls 126 are the components of the vehicle 102 that control the navigation of the vehicle 102. The navigation component 118 sends instructions to the navigation controls 126 to transport the vehicle 102. The navigation component 118 interprets data from external sensors 122 to determine location, observe road conditions, find obstacles, read signage, determine relative positioning to other vehicles or moving objects, and interpret any other relevant events occurring external to the vehicle 102. The navigation component 118 can also interpret data from operation sensors 228 to determine the road conditions, mechanical conditions, and electrical conditions of the vehicle 102. The navigation component 118 then may use this interpretation to determine a best course of action for the vehicle 102. Once a best course of action is selected, the navigation component 118 determines the instructions that will execute the best course of action and sends those instructions to the navigation controls 126 that, when executed, operate the vehicle 102.

The communication component 128 facilitates the reception and transmission of data from the vehicle 102. When the vehicle 102 recognizes a potential passenger, data regarding the passenger and the vehicle 102 is transmitted by the communication component 128. Other vehicles 102n that receive the transmission may then transmit data back to the vehicle 102 regarding the positions of the other vehicles 102n and availability of the other vehicles 102n to pick up the passenger. Availability of the other vehicles 102n may be determined in any way. In one embodiment, availability is determinant on other vehicle 102n not currently having passengers inside, not currently driving toward prospective passengers, and in operable condition to drive at least one hundred or more miles without stopping. In one embodiment, the vehicle computer 106 then determines whether the vehicle 102 should pick up the pedestrian based on data received from the other vehicles 102n. Any criteria may be used to determine which vehicle 102 should pick up the pedestrian. In an exemplary embodiment, the closest vehicle 102 to the pedestrian that is not currently occupied will determine that it will be the vehicle 102 to pick up the pedestrian.

In an exemplary embodiment, also shown in FIG. 3, the communication component 128 transmits data to a server that is connected to the multitude of other vehicles 102n. The server then determines which vehicle 102 should pick up the pedestrian. In an exemplary embodiment, there are no other vehicles 102n. The vehicle computer picks up the potential pedestrian determinant or based on the availability of the vehicle 102. In an exemplary embodiment, the vehicle 102 sends a signal to the potential passenger informing the passenger that one of the other vehicles 102n is on the way to pick up or receive the passenger. The signal may be sent in any way. One example of a signal is flashing a light directly at the potential pedestrian. Another example of a signal is displaying a message on a display that is visible to the pedestrian. The message may say anything that indicates to the pedestrian that other vehicles 102n will pick up the pedestrian. Another example of a signal is playing an audio message on a speaker, telling the pedestrian that a vehicle is on the way to pick up the pedestrian. Another embodiment of the signal may be displaying the estimates time of arrival for the vehicle or the other vehicles 102n to pick up the pedestrian.

Figure 2:
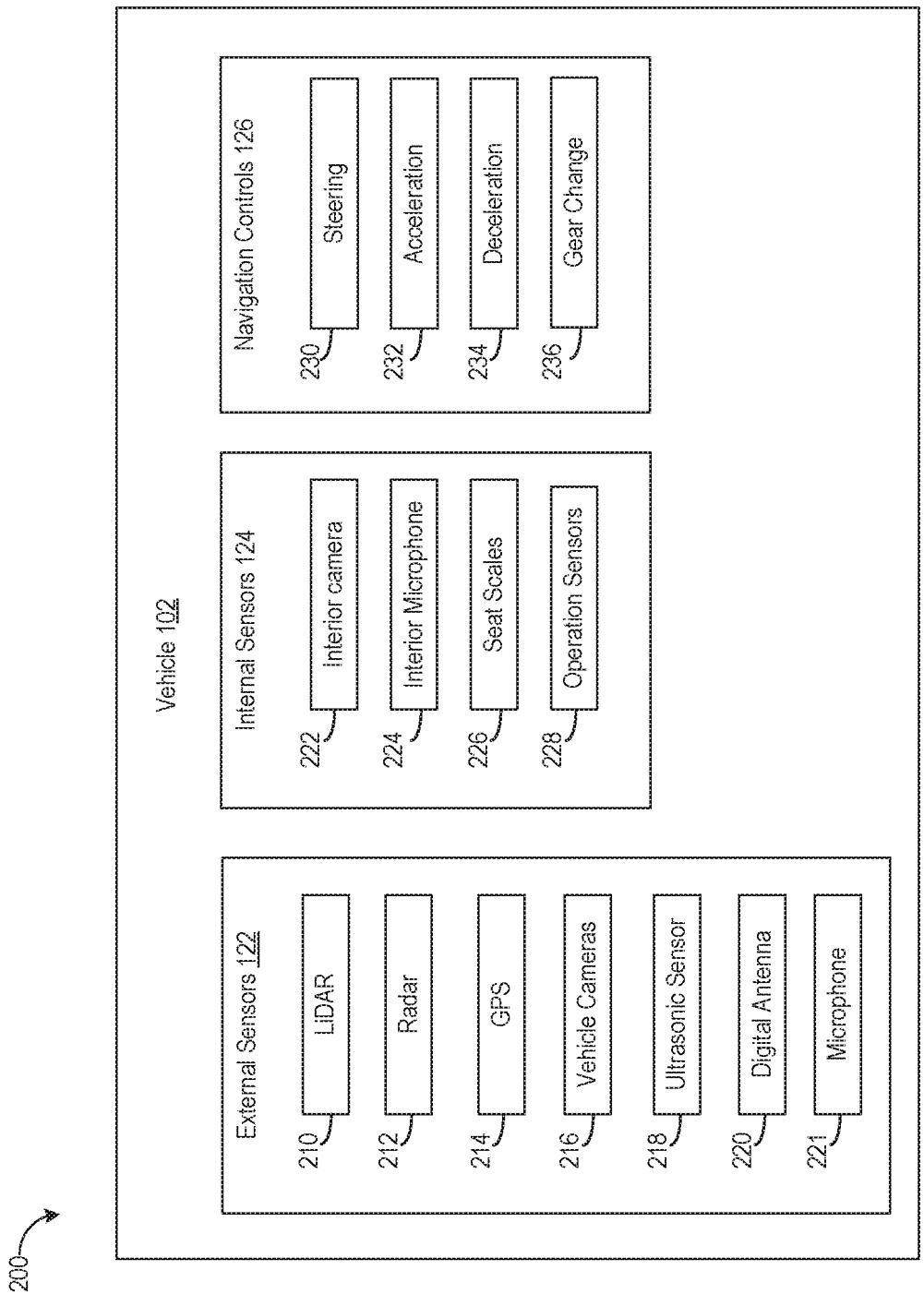
FIG. 2 is a schematic diagram illustrating the components of a vehicle that may be used to implement various features of the embodiments described in the present disclosure.

Referring to FIG. 2, FIG. 2 is a schematic diagram 200 of various components that may be in the vehicle 102. The various components may be used to implement the various features in the present disclosure. Various components shown in the vehicle 102 include external sensors 122, internal sensors 124 and navigation controls 126. The external sensors 122 collect data from the environment outside the vehicle 102. In the exemplary embodiments, the external sensors 122 may include LiDAR 210, radar 212, GPS 214, vehicle cameras 216, ultrasonic sensors 218 for proximity, digital antennas 220, and a microphone 221. Data collected from external sensors 122 can be interpreted by the navigation component 118 to determine the current location and the future predicted location of the vehicle 102.

The LiDAR 210 on the vehicle 102 comprises an emitter capable of emitting pulses of light and a receiver capable of receiving the reflecting of the pulses of light. In an exemplary embodiment, the LiDAR 210 emits light in the infrared range. The LiDAR 210 measures the distance to objects by emitting a pulse of light and measuring the time it takes for the light to reflect back to the receiver. The LiDAR 210 can rapidly scan the environment outside the vehicle 102 to generate a three-dimensional map of the surroundings of the vehicle 102.

The radar 212, like the LiDAR 210, comprises an emitter and a receiver. The radar 212 sensor emitter is capable of emitting longer wavelengths of light than LiDAR that are typically in the radio wave spectrum. In an exemplary embodiment, the radar 212 emits a pulse of light at about 3 mm-about 5 mm wavelength. The longer wavelength light from radar 212 will go through some objects that LiDAR 210 pulses would reflect.

The vehicle global positioning system ("GPS") 214 receives a satellite signal from GPS satellites and can interpret the satellite signal to determine the position of the vehicle 102. The GPS 214 continually updates the vehicle 102 position and sends the position to the navigation component 118.

Vehicle cameras 216 can capture image data and send the image data to the navigation component 118. The navigation component 118 can process the image data of objects and other environmental features around the vehicle 102. In an exemplary embodiment, images from vehicle cameras 216 are used to identify and read street signs. In an exemplary embodiment, images from vehicle cameras 216 are used to identify lane markings and crosswalks.

Data from ultrasonic sensors 218 may also be used to identify the environment outside the vehicle 102. Ultrasonic sensors 218 detect objects by emitting sound pulses and measuring the time to receive those pulses. Ultrasonic sensors 218 can often detect very close objects more reliably than LiDAR 210, radar 212 or vehicle cameras 216.

Digital antennas 220 collect data from cell towers, wireless routers, and Bluetooth devices. Outside computer systems may transmit data about the outside environment. Such data may be collected by digital antennas 220. In an exemplary embodiment, a digital antenna 220 collects data transmitted from a cell tower about road conditions. The microphone 221 collects audio data from outside the vehicle 102. Audio data may include audio hailing communications from potential passengers.

Internal sensors 124 in the vehicle 102 can inform the vehicle computer 106 of the condition of the vehicle 102 and the condition of any individuals inside the vehicle 102. Internal sensors 124 include interior cameras 222, interior microphones 224, seat scales 226, and operation sensors 228. The interior camera 222 may be one or more cameras capable of capturing image data from the interior of the vehicle 102. In an exemplary embodiment, image data from the interior camera 222 is used to determine the number of individuals in the vehicle 102 and where the individuals are sitting. In an example, the interior camera 222 is configured to capture infrared image data that shows the heat emitted from objects inside the vehicle. Infrared image data may be used to distinguish inanimate objects from human beings. In other embodiments, the interior camera 222 may be coupled to a facial recognition system that is capable of recognizing the individual.

The interior microphone 224 in the vehicle records sounds from inside the vehicle 102. In an exemplary embodiment, the individual may communicate a destination to the vehicle 102 by speaking into the interior microphone 224. The interior camera 222 may be used in combination with the interior microphone 224 to verify the identity of the individual speaking. In an exemplary embodiment, facial recognition is used by an interior camera 222 images to identify the individual that is speaking into the interior microphone 224. The interior microphone 224 may also be used to determine if the driving system of the vehicle 102 is making noises that indicate poor working condition.

The seat scales 226, like the interior camera 222, may be used to determine the number of individuals that are inside the vehicle 102 and where they are sitting. Data from seat scales 226 may also be used to determine if an individual is light enough to require a child protective seat. The interior camera 222 may be used in combination with the seat scales 226 to distinguish between a light child and an inanimate object such as a package. In an exemplary embodiment, an infrared image from the interior camera 222 is used to verify that there is an individual child in a seat where the seat scale 226 registers a weight.

Operation sensors 228 in the vehicle 102 collect data from vehicle operations such as engine performance, fluid levels, tire pressure, and fuel/battery level. Data from the operation sensors 228 may be used to determine if the vehicle 102 can go to certain destinations such as destinations outside of the fuel range of the vehicle 102.

The navigation controls 126 include steering 230, acceleration 232, deceleration 234 and gear change 236. The steering 230 navigation control changes the direction of the vehicle 102 and can be operated through a steering wheel, handlebars, joystick, shifting weight, or any other method of steering a vehicle. In an exemplary embodiment, the steering 230 control is manipulated by a steering actuator under control of the navigation component 118. The acceleration 232 navigation control is a control that increases the velocity of the vehicle 102. In an exemplary embodiment, the navigation component 118 controls the acceleration 232 of the vehicle 102 by sending instructions to an electronic throttle control. The deceleration 234 navigation control is a control that decreases the velocity of the vehicle 102. In an exemplary embodiment, the navigation component 118 controls the deceleration 234 by sending instructions to a brake by wire system. The gear change 236 navigation control changes the gear ratio of a vehicle 102 if the vehicle 102 has multiple gear ratios. In an exemplary embodiment, the navigation component 118 controls the gear change through a shift by wire system.

Figure 3A:
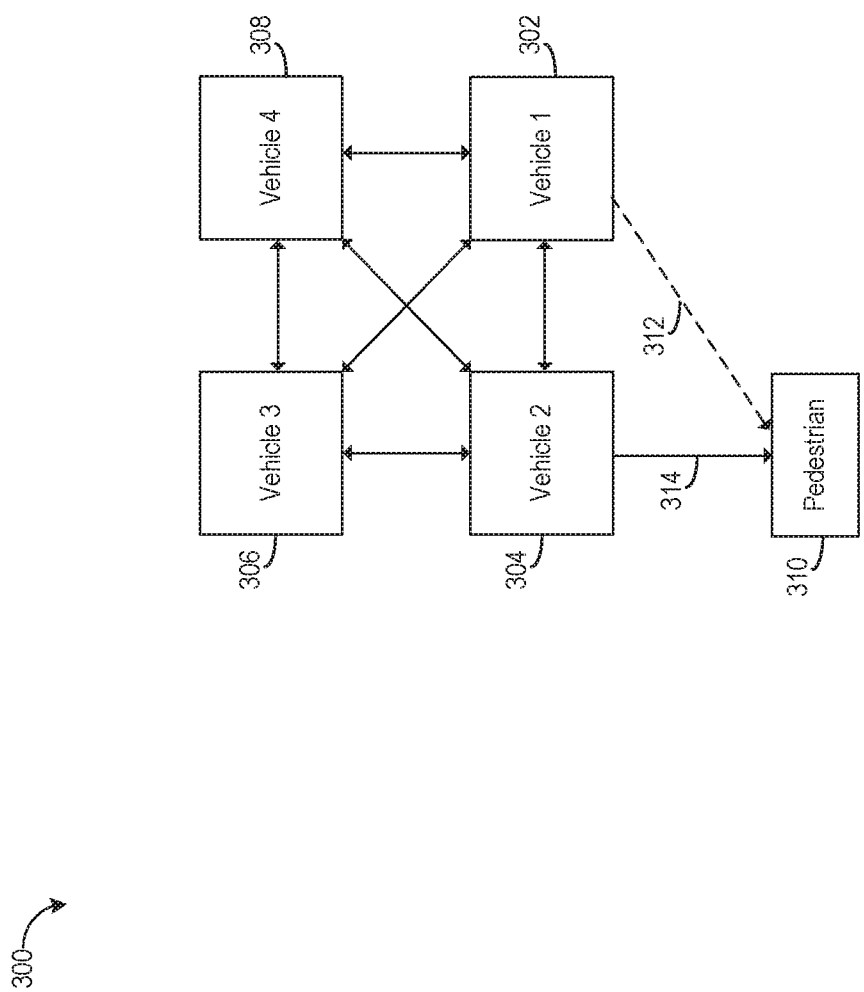
FIG. 3A is a schematic diagram illustrating multiple vehicles configured to use the autonomous passenger transport system.

Referring to FIG. 3A, a schematic 300 of multiple vehicles 102 may be configured to use the autonomous passenger transport system. It includes vehicle 1 302, vehicle 2 304, vehicle 3 306, and vehicle 4 308. As shown by the two-sided arrows that link vehicles 102 in FIG. 3A, all vehicles 102 are in communication with one another. The communication may be through any means. In one embodiment, the vehicles 102 are connected through a cellular network protocol. In an exemplary embodiment, the vehicles 102 communicate through radio wave signaling. In other embodiments, the vehicles may communicate with each other via a cloud or satellite based system.

As shown by the dotted line 312, Vehicle 1 302 spots a pedestrian 310 with the pedestrian identification component 112 of Vehicle 1 302. Vehicle 1 302 recognizes the body gestures of the pedestrian 310 using the gesture recognition component 114. The gestures indicate that the pedestrian 310 is a potential passenger that desires transportation. The communication component 128 of Vehicle 1 302 then transmits the potential passenger information and information of Vehicle 1 302 to the other vehicles. The potential passenger information may include any information about the passenger. In one embodiment, the potential passenger information includes just the location of the potential passenger. In an exemplary embodiment, the potential passenger information includes the image of the passenger, the gesture that the passenger used to be recognized, and the number of individuals that appear to be with the potential passenger. The number of individuals that appear to be with the potential passenger may be determined by determining which individuals are verbally communicating with each other. The vehicle information may include any information relevant to the vehicles 102 including, but not limited to: the vehicle 102 position, the availability of the vehicle 102 to pick up passengers, and the likelihood that the vehicle 102 will soon see a potential passenger. The other vehicles 102n receive the transmission with their communication components 128. The other vehicles 102n then transmit the other vehicle information back to vehicle 1 302. The vehicle selection component 116 of vehicle 1 302 then determines which vehicle 102, including vehicle 1 302, vehicle 2 304, vehicle 3 306, and vehicle 4 308 should pick up the potential passenger. As shown by the solid arrow 314 from vehicle 2 304 to the pedestrian 310, vehicle 2 304 was selected to pick up the pedestrian.

Figure 3B:
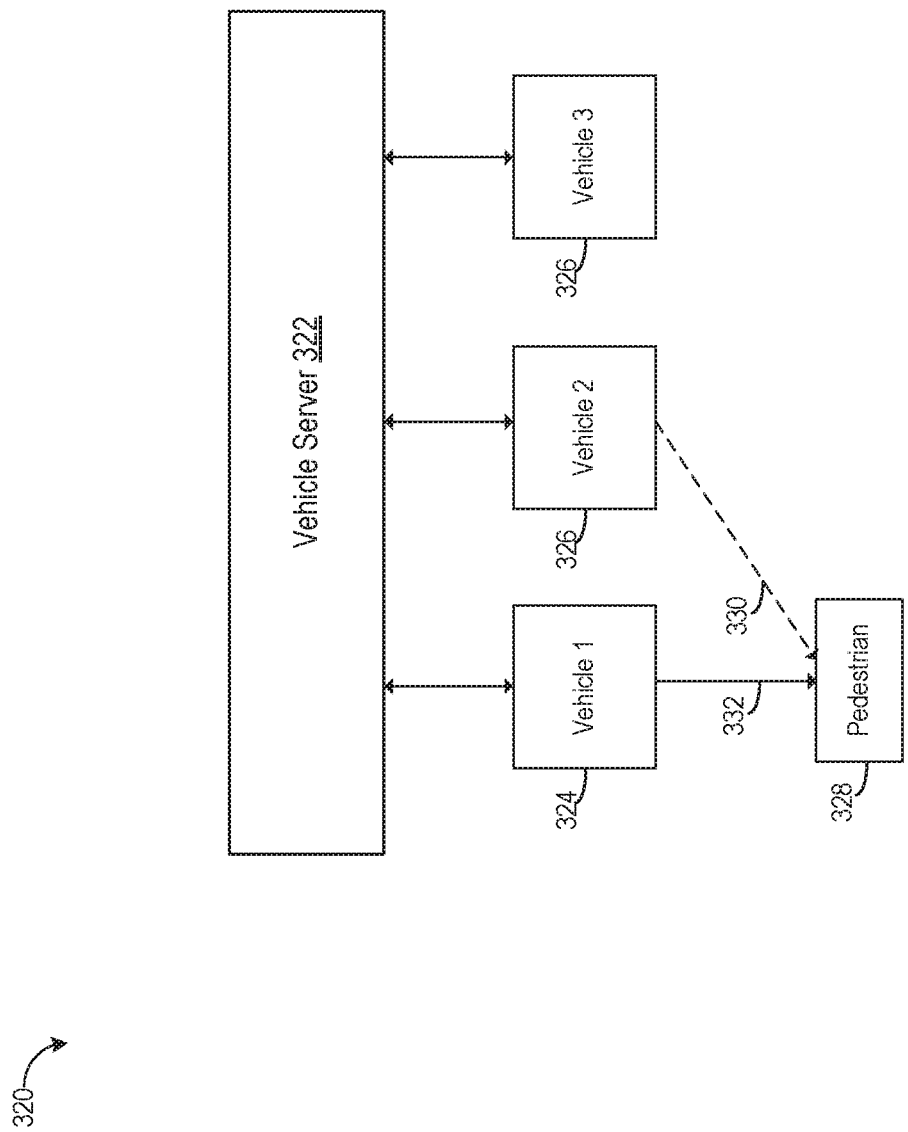
FIG. 3B is a schematic diagram illustrating multiple vehicles and a vehicle server configured to use the autonomous passenger transport system.

Referring to FIG. 3B, FIG. 3B is a schematic 320 for an embodiment of the disclosed subject matter with vehicle server 322 that communicates with one or more vehicles. Instead of communicating with one another, as shown in FIG. 3A, the vehicles 102 in FIG. 3B communicate with a vehicle server 322. As illustrated by the two-sided arrows, vehicle 1 324, vehicle 2 326, and vehicle 3 326 are in communication with the vehicle server 322. The vehicle server 322 may be any computer capable of transmitting data to multiple vehicles 102. In one embodiment, the vehicle server 322 performs all functions of the vehicle computer 106. In this embodiment, the vehicle server 322 contains the pedestrian identification component 112, the gesture recognition component 144, the vehicle selection component 116, the navigation component 118, and the passenger communication component 120.

In an exemplary embodiment, some components of the vehicle computer 106 maybe located in the vehicle 102 and some components of the vehicle computer 106 may be located in the vehicle server 322. In an example of this embodiment, the vehicle selection component 116 of the vehicle computer 106 is located in the vehicle server 322 while the pedestrian identification component 112, gesture recognition component 114, navigation component 118, and passenger communication component 120 are located in the vehicle 102.

As shown in FIG. 3B by the dotted line 330, vehicle 2 326 recognizes the pedestrian 328 as a potential passenger. Vehicle 2 326 then communicates the information related to the pedestrian 328 and vehicle information to the vehicle server 322. The vehicle server 322 may then instruct a vehicle 102 to pick up the pedestrian 328. As shown by the solid arrow 332, vehicle 1 324 is instructed by the vehicle server 322 to pick up the pedestrian 328.

Figure 3C:
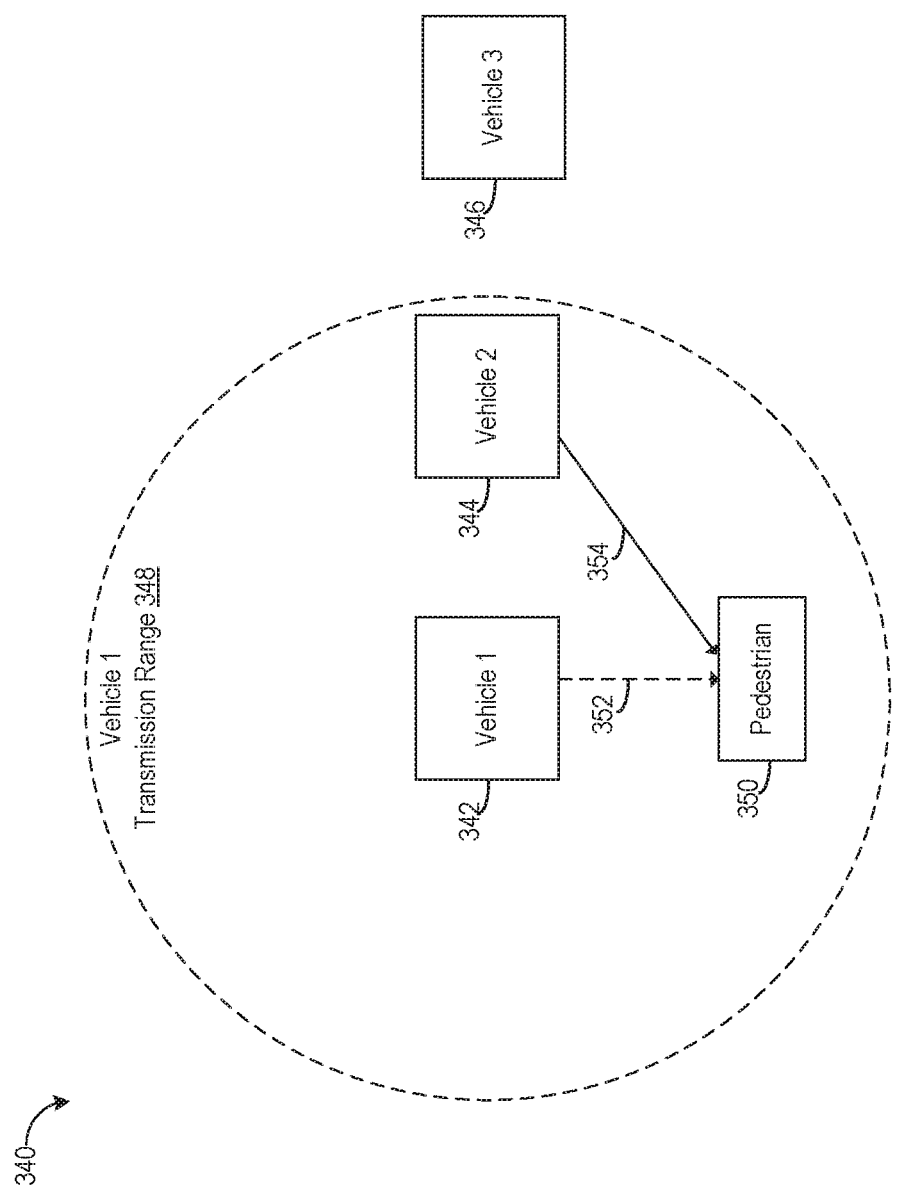
FIG. 3C is a schematic diagram illustrating multiple vehicles that may not be in communication range of one another and are configured to use the autonomous passenger transport system.

Referring to FIG. 3C, FIG. 3C illustrates a schematic 340 of an exemplary embodiment of the autonomous passenger transport system with limited transmission range between vehicles 102. Vehicle 1 342, vehicle 2 344, and vehicle 3 346 are all vehicles 102 of the present disclosure. As shown by the dotted circle of the vehicle 1 transmission range 348, only vehicle 2 344 is within the transmission range of vehicle 1 342. Vehicle 3 346 is unable to directly communicate with vehicle 1 342. As shown by the dotted arrow 352, vehicle 1 342 recognizes the pedestrian 350 as a potential passenger. Vehicle 1 342 transmits the pedestrian 350 information and vehicle information to all vehicles in the vehicle 1 transmission range 348. Vehicle 2 344 receives the transmission. Vehicle 3 346 does not receive the transmission. As shown by the solid arrow 354, the vehicle selection component 116 determines that vehicle 2 344 will pick up the pedestrian 350.

In an exemplary embodiment, vehicles 102 retransmit transmissions that the vehicles 102 receive. In an example of this embodiment, vehicle 2 344 retransmits the transmission from vehicle 1 342. Additional vehicles 102 such as vehicle 3 346 may be in transmission range of vehicle 2 344.

Figure 4:
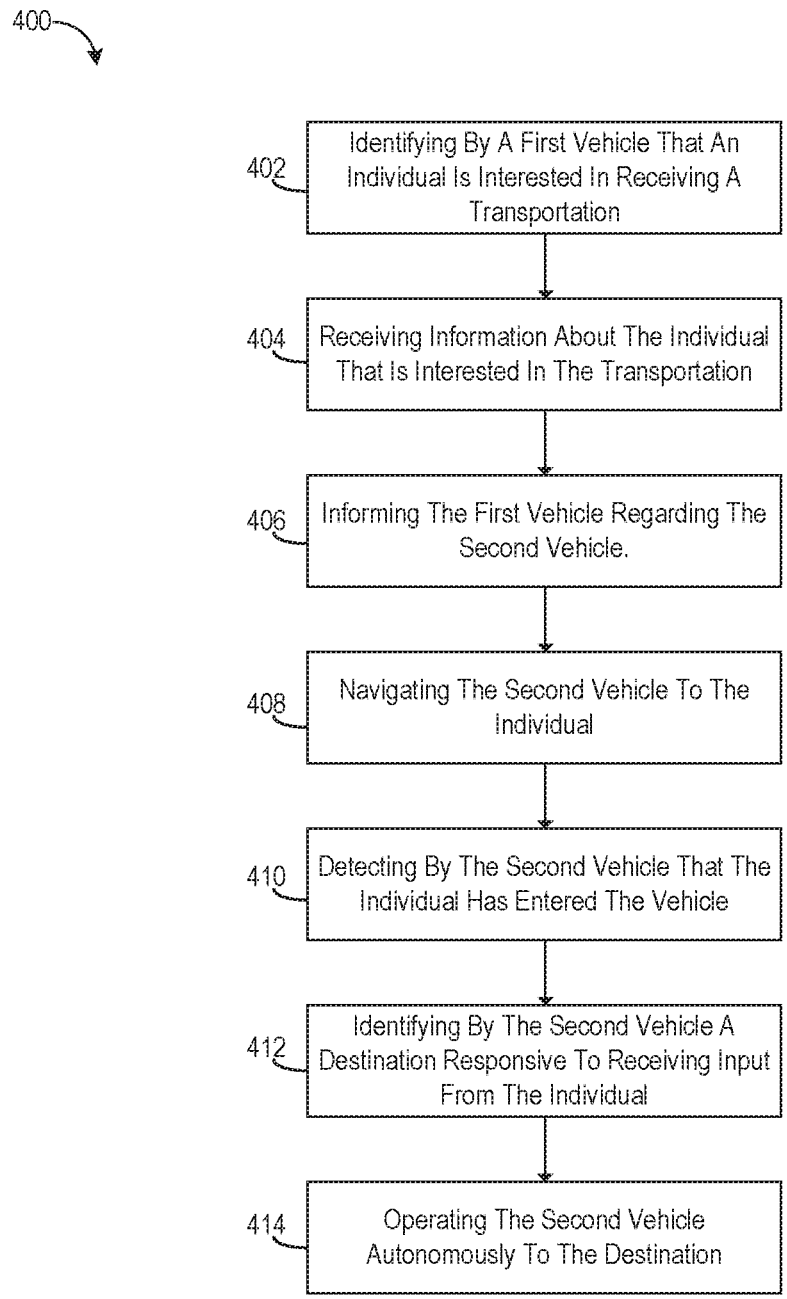
FIG. 4 is a flow diagram of a process for autonomously identifying and transporting a passenger.

Referring to FIG. 4, FIG. 4 is a flow diagram of a process 400 for transporting a gesturing pedestrian in a vehicle 102 that may be operated autonomous. At step 402, a vehicle 102 identifies that an individual is interested in receiving a transportation. In this step, the external sensors 122 constantly and/or periodically scan the road for objects. External sensors that scan the road for objects may include, but are not limited to LiDAR 210, radar 212, and vehicle cameras 216. Individuals are then identified by the pedestrian identification component 112. Individuals may be differentiated from other objects. A person skilled in the art of object identification will understand how to perform this step. In one example, the shape of objects is ascertained from the image taken by the vehicle cameras 216. Objects with a shape of a person, with a head, an upright torso, and limbs, are identified as pedestrians. The gesture recognition component 114 may determine that the individual is interested in receiving transportation based on sensor data of the individual. There are many possible ways for an individual to show interest in receiving a transportation. In one example, a taxi hailing motion, of holding one arm up and perpendicular to the vehicle 102, is captured by the vehicle camera 216. In another example, the microphone 221 records the individual saying, "I want a ride." The disclosed subject matter is not limited by the type of gestures an individual may use to show interest in receiving transportation. The vehicle 102 then transmits the information of the individual with the communication component 128 to other vehicles 102.

At step 404, other vehicles 102n receive information about the individual that is interested in the transportation. The information about the individual was transmitted from the vehicle 102. The information regarding the individual may include properties about the individual, including height, appropriate weight, color of clothing, length of hair, type of watch, The communication component 128 of the other vehicle 102n receives the transmission. The vehicle selection component 116 selects the other vehicle 102n to pick up the individual. At step 406, the other vehicle 102n informs the vehicle 102 information regarding the other vehicle 102n. The information regarding the other vehicle 102n may be any information that indicates that the other vehicle 102n will pick up the individual. In one embodiment, the vehicle 102 sends a message to the individual to indicate that one of the other vehicles 102n is on the way to pick up the individual and an estimated time of pick up. The message may further include at least one of, the license plate number of the other vehicle 102n, the make, model and color of the other vehicle 102n, the number of available seats, amount of luggage that may be stored within the other vehicle 102 and the like.

At step 408, the navigation component 118 of the other vehicle 102n navigates the other vehicle 102n to the individual. Once the other vehicle 102n navigates to the location of the individual, the individual may enter the other vehicle 102n. At step 410, the other vehicle 102n detects that the individual has entered the other vehicle 102n. Data from internal sensors 124 may be used to indicate that the individual has entered the other vehicle 102n. In one example, the operation sensor 228 senses that a door opened and closed. Data from the interior camera 222 and seat scales 226 confirm that the individual is inside the other vehicle 102n. The number of individuals that enter the other vehicle 102n is only limited by the space in the other vehicle 102n for passengers. No embodiment limits the disclosed subject matter to one individual entering the other vehicle 102n.

At step 412, the other vehicle 102n identifies a destination based on input received from the individual. The individual may indicate a destination in any way. In one embodiment, the destination is received by the interior microphone 224 as the individual speaks the name of a location. In an exemplary embodiment, the individual enters the location into a console located inside the other vehicle 102n. Also, in an exemplary embodiment, the individual may enter the destination information into a digital device such as a mobile phone. The mobile phone may then transmit the destination information to the digital antenna 220 of the other vehicle 102n.

At step 414, the other vehicle 102n navigates to the destination received from the individual. In one embodiment, this step is conditionally performed upon the acceptance of payment from the individual. The individual may pay the vehicle 102 in any way. In one embodiment, the interior camera 222 of the other vehicle 102n identifies the individual through facial recognition. The identity of the individual is then linked to an account that can be debited. The other vehicle 102n may ask the individual to confirm the payment. The confirmation may be performed in any way including, but not limited to, nodding the head of the individual, the individual speaking the confirmation such as saying "yes," and the individual pressing a button in the other vehicle 102n.

Although the process 400 as shown FIG. 4 discloses other vehicle 102n as picking up the individual, the disclosed subject matter does not limit the vehicle 102 from picking up the individual. In other embodiments, the vehicle 102 may receive the individual. The vehicle selection component 116 may determine that the vehicle 102 will pick up the individual.

Figure 5:
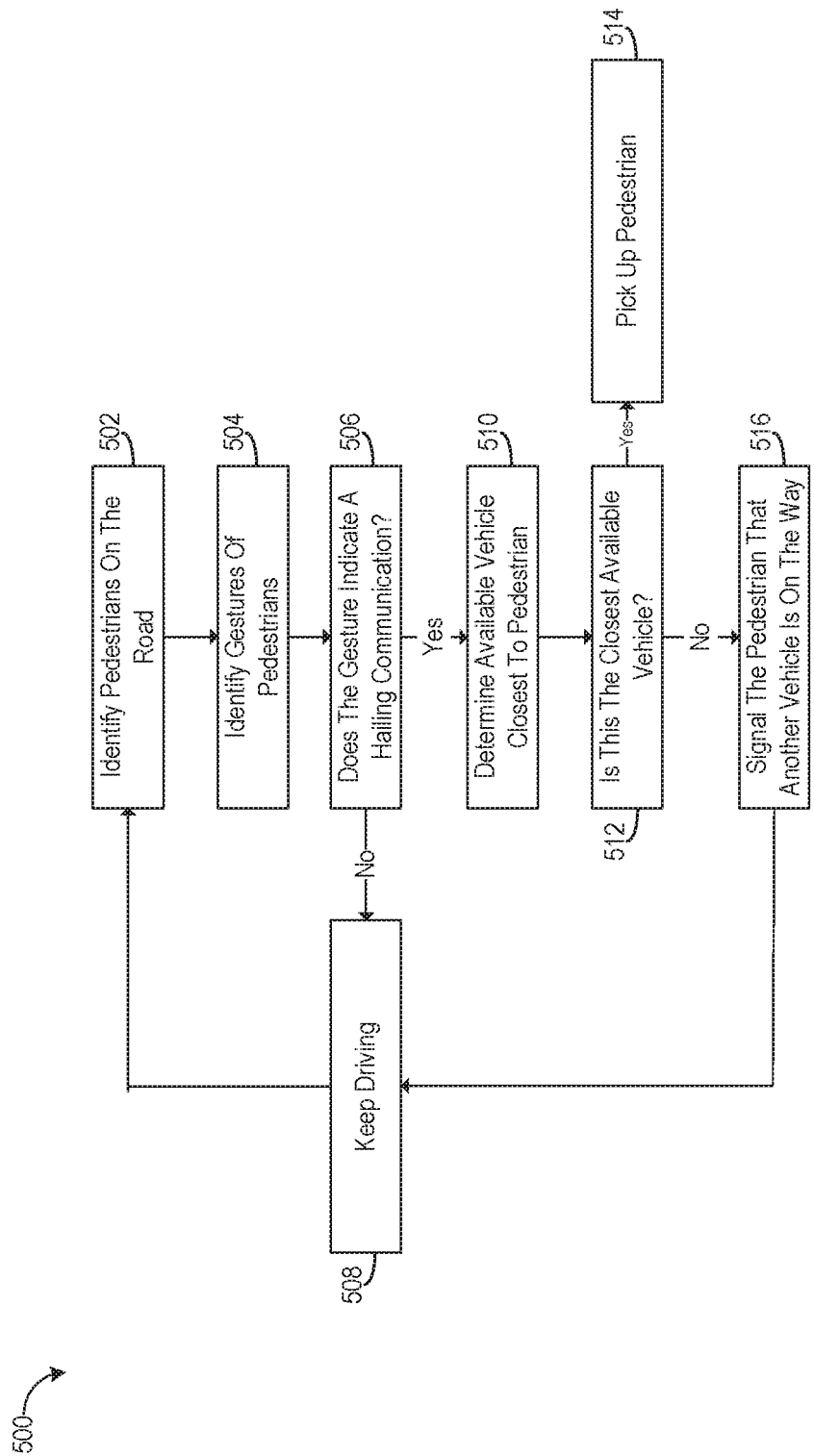
FIG. 5 is a flow diagram of a process for a single autonomous vehicle implementing an embodiment of the described implementation.

Referring to FIG. 5, FIG. 5 is a flow diagram of the process 500 for transporting a gesturing pedestrian for a vehicle 102 that is capable of driving autonomously. The vehicle 102 may be driving randomly or on a set path looking for potential passengers using external sensors. The vehicle 102 may have multiple purposes, one of which is to transport passengers that want transportation.

At step 502, the vehicle 102 identifies pedestrians on the road. As disclosed in step 402, the vehicle 102 uses external sensors 122 to distinguish pedestrians from objects on the road. At step 504, the vehicle 102 identifies gestures of the identified pedestrians. The gesture is a non-digital communication by the pedestrian. Gestures may be any individual position or action including but not limited to vocal speech of the pedestrians. Thus, the vehicle 102 records still images, moving images, and audio from pedestrians using external sensors 122.

At step 506, the gesture recognition component 114 determines if the identified gesture is a hailing communication. A hailing communication indicates that the pedestrian is interested in receiving transportation from the vehicle 102. The gestures that indicate a hailing communication are not set and may vary by location. Certain gestures, such as holding an arm up perpendicular to the vehicle 102 universally indicate a hailing communication. Other gestures, such as looking and nodding at the vehicle 102 are more subtle. A machine learning algorithm, an example of which is shown in FIG. 6, may be employed by the vehicle 102 to determine the fine differences between a gesture that indicates a hailing communication and a gesture that does not.

Figure 7:
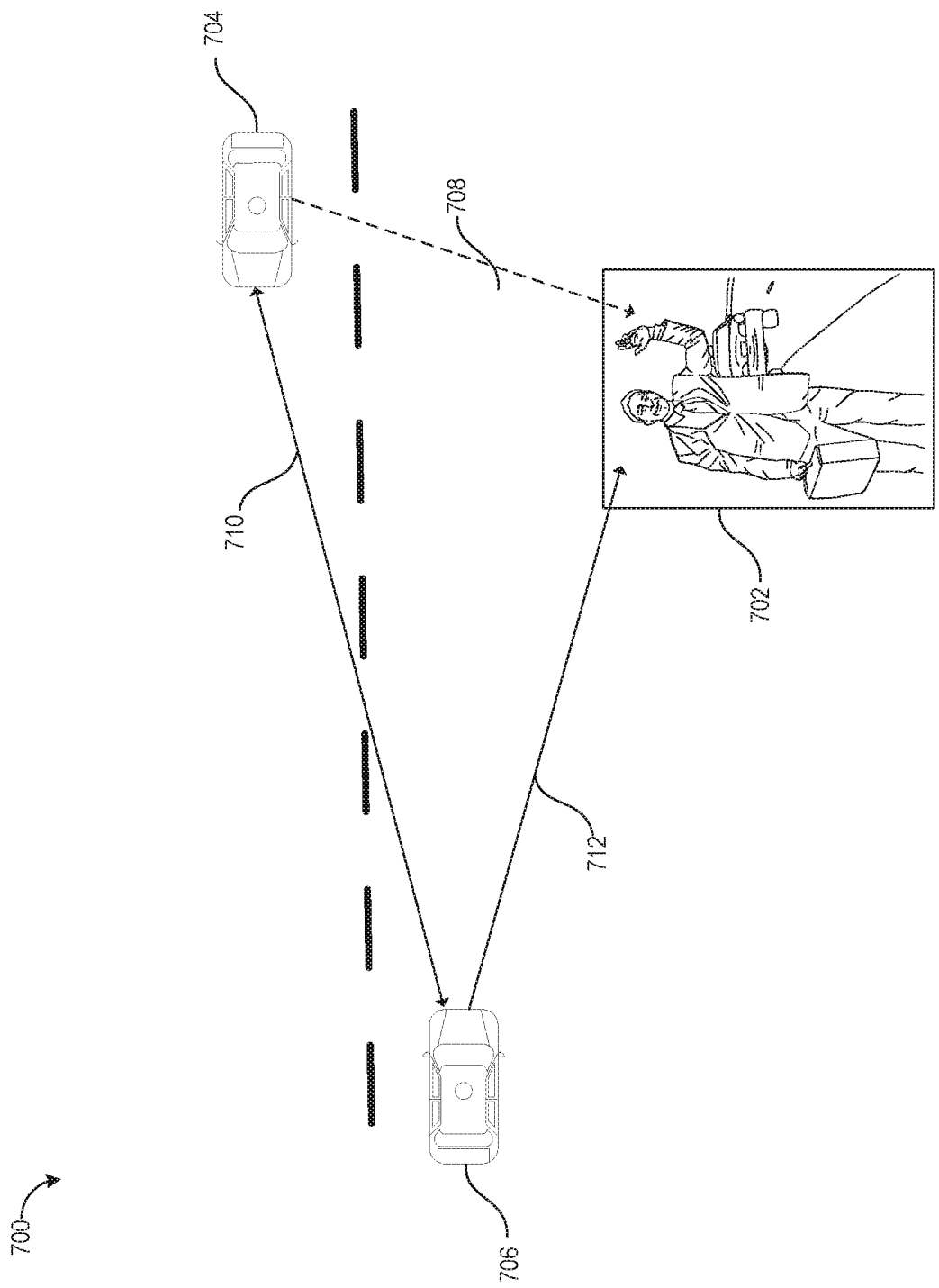
FIG. 7 illustrates an example of a first vehicle identifying a passenger and a second vehicle navigating to the passenger.

At step 508, if the gesture recognition component 114 determines that a gesture is not a hailing communication, the vehicle keeps driving and performs step 502 once again to identify pedestrians on the road. At step 510, if the gesture recognition component 114 determines that a gesture is a hailing communication, the vehicle selection component 116 determines the vehicle 102 that is available and closest to the pedestrian. Criteria other than the vehicle 102 that is available and closest to the pedestrian may be used to determine which vehicle 102 will pick up the pedestrian. This embodiment does not limit the criteria for determining the vehicle 102 by the vehicle selection component 116. The vehicle 102 that is closest may be closest in physical distance to the pedestrian or the vehicle 102 may be closest in driving distance to the pedestrian. An example of a vehicle 102 that is closest in physical distance, but not driving distance is shown in FIG. 7. Any criteria may be used to determine whether a vehicle 102 is available. In one embodiment, a vehicle 102 is available if it is not currently driving a passenger or driving toward a pedestrian. In an exemplary embodiment, a vehicle 102 that is only partially occupied with passengers is still available. In this embodiment, availability may be further determined by how long that pedestrian would have to wait for other vehicles 102n. If the pedestrian would have to wait more than a set amount of time for other vehicles 102n, the partially occupied vehicle 102 that first recognized the pedestrian would be available.

At step 512, the vehicle 102 takes one of two courses determinant on whether the vehicle selection component 116 determined that the vehicle 102 or other vehicles 102n is available and closest to the pedestrian. If the vehicle 102 is available and closest to the pedestrian, the vehicle 102 navigates to the pedestrian to pick up the pedestrian at step 514. Alternatively, at step 516, if the vehicle 102 is not closest to the pedestrian and available, the vehicle 102 signals to the pedestrian that other vehicles 102n is on the way to pick up the pedestrian. The signal to the pedestrian in step 516 may be any signal that a vehicle 102 is capable of making it to a pedestrian. In one example, the vehicle 102 flashes a light at the pedestrian. In another example, the vehicle 102 displays a message on an LED display indicating that another vehicle 102 is on the way. In yet another example, the vehicle 102 plays an audio message to the pedestrian. After the vehicle 102 sends the signal, the vehicle 102 keeps driving and returns to step 502.

Figure 6:
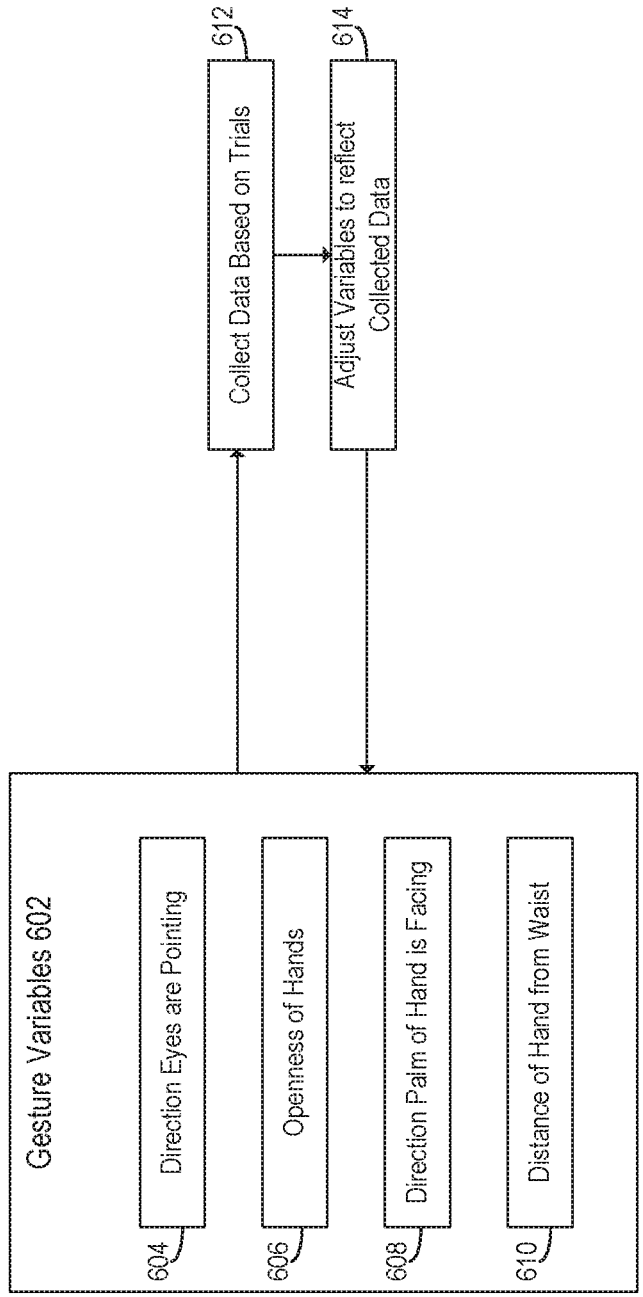
FIG. 6 is a flow diagram of a process for learning the gesture variables that indicate that an individual is interested in receiving transportation.

Referring to FIG. 6, FIG. 6 is a schematic of a gesture learning engine 600 that may be employed by the vehicle 102 in the disclosed subject matter. The gesture learning engine 600 is used to learn or modify the gestures that a vehicle 102 recognizes in individuals on the road. The gesture learning engine 600 includes gesture variables 602. The gesture variables 602 are not limited to the variables shown in FIG. 6. Any number of gesture variables 602 may be envisioned for other embodiments. The gesture variables include the direction eyes are pointing 604, the openness of the hands 606, the direction the palm of the hand of an individual is facing 608, and the distance of hands from the waist 610 of an individual.

The gesture recognition component 114 may consider all of the gesture variables 602 as a whole to determine if an individual is interested in a transportation, or the gesture recognition component 114 may consider a subset of gesture variables 602 or just one gesture variable 602. The direction eyes are pointing 604 variable is the vector direction that comes out of the pupils of the eyes of an individual. The direction eyes are pointing 604 variable tends to indicate that an individual is interested in receiving a transportation if the direction eyes are pointing 604 toward the vehicle 102. If the vehicle cameras 216, cannot make out the pupils of an individual, the direction eyes are pointing 604 variable may be approximated from the direction the head of an individual is pointing.

The value of the openness of hands 606 variable is determined by the degree to which the fingers of the hands of an individual are clenched into a fist. An openness of hands 606 variable value of fully open tends to indicate that an individual is interested in receiving transportation in the vehicle 102. This variable may likely be considered in combination with the direction palm of hand is facing 608 variable. The direction palm of hand is facing 608 variable is the direction of the vector that points away from the face of the palm of the hand of an individual. A palm that is facing a vehicle 102 tends to indicate that an individual is interested in receiving a transportation from the vehicle.

The distance of hand from waist 610 variable is the distance measured from the waist of an individual to the hand of an individual. A large value in the distance of hand from the waist 610 tends to indicate that an individual is interested in receiving a transportation from a vehicle 102.

All gesture variables 602 may be used in combination with one another. For instance, it may be found that a positive open hand is more indicative of an individual that is interested in a transportation only if the palm of the individual is facing 608 the vehicle.

For all of the gesture variables 602 that refer to two body parts, such as both hands, one or both body parts may be considered for the variable. The gesture variables 602 values of two hands may be combined or considered separately.

The best values for the gesture variables 602 may not be known, therefore the gesture learning engine 600 may be employed to find the best values. There are many ways in which a learning engine may be employed to find the best values of gesture variables 602. The disclosed subject matter is not limited to the steps shown in FIG. 6. At step 612, data is collected based on trials to determine if the gesture of an individual indicates that the individual is interested in a transportation in a vehicle 102. To start trials, best guesses may be used as the beginning values for the gesture variables 602. In each trial, a gesture recognition component 114 determines the values of gesture variables 602 from image data. The values of gesture variables 602 are then correlated to the best guesses for values that indicate that an individual is interested in receiving transportation in a vehicle 102. Data may be gathered in real time picking up pedestrians or run from image data that is already collected.

At step 614, the best guesses for gesture variables 602 values are adjusted to fit the collected data. Any number of trials may be run before adjusting the gesture variables 602 values. Once best variable values that indicate individuals are interested in receiving a transportation are updated, gesture recognition may be run using the updated values.

Referring to FIG. 7, FIG. 7 is an illustration of a first vehicle 704 recognizing a pedestrian 702 and a second vehicle 706 picking up the pedestrian 702. The gesturing pedestrian 702 may be any individual that is making a gesture that indicates that the individual is interested in receiving transportation. As shown by the dotted line 708, the first vehicle 704 recognizes that the gesture of the pedestrian 702 indicates that the pedestrian 702 is a potential passenger. As shown by the two-sided arrow 710, the first vehicle 704 then transmits the pedestrian 702 information and first vehicle 704 information to the second vehicle 706.

The vehicle selection component 116 of the second vehicle 706 then determines that the second vehicle 706 will pick up the pedestrian 702. Alternatively, in an exemplary embodiment, the vehicle selection component 116 of the first vehicle 704 determines which vehicle will pick up the pedestrian 702. In the illustration 700, the first vehicle 704 is physically closer to the pedestrian 702 than the second vehicle 706, but the first vehicle 704 is on the opposite side of the street from the pedestrian 702. The route to the pedestrian 702 may be shorter for the second vehicle 706 than the first vehicle 704. As shown by the solid arrow 712, the second vehicle 706 then navigates to the pedestrian 702. In one embodiment, the first vehicle 704 signals to the pedestrian 702 that the second vehicle 706 is on the way to pick up the pedestrian 702.

Figure 8:
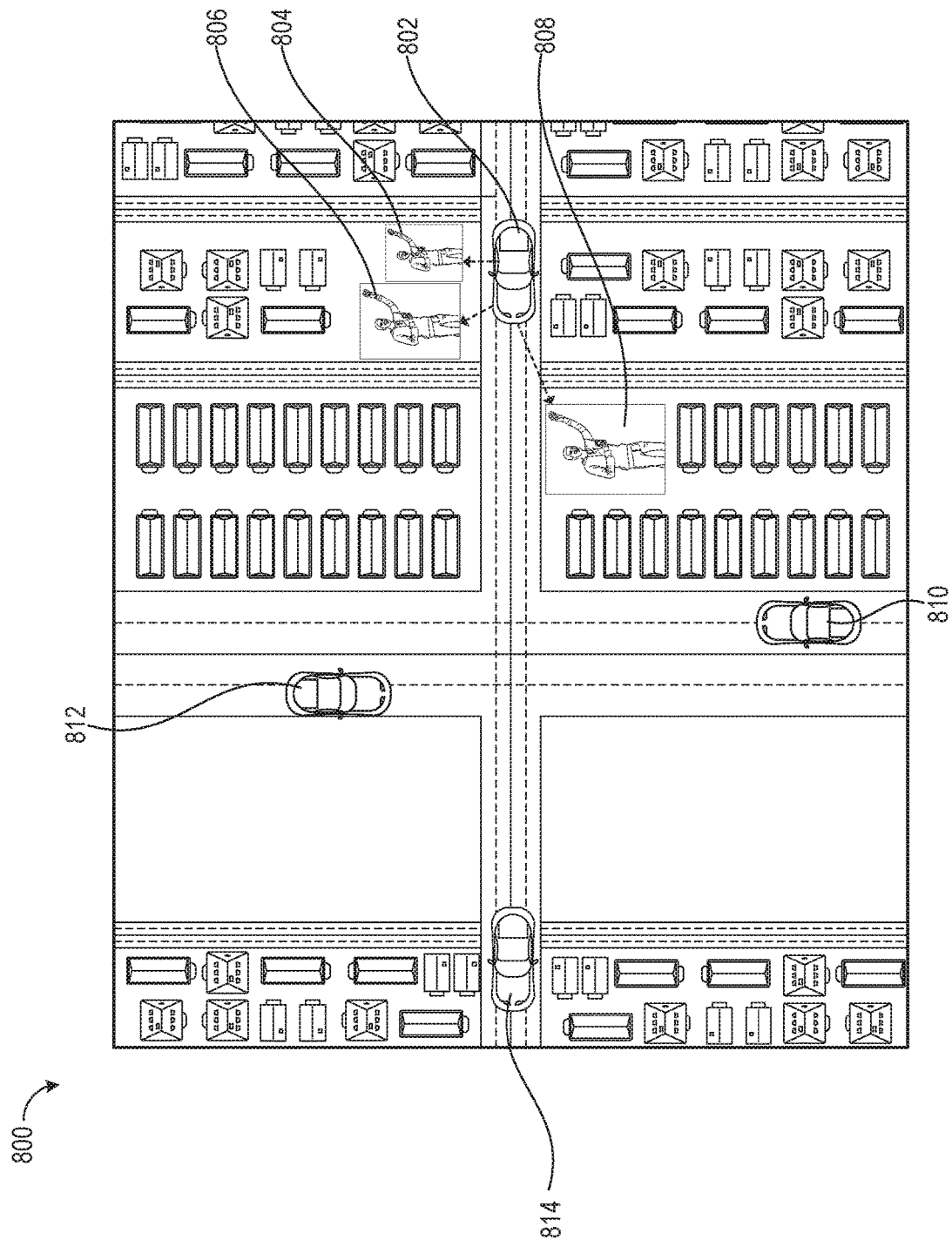
FIG. 8 illustrates an example of a first vehicle identifying multiple passengers and communicating the locations of the passengers to multiple vehicles.

Referring to FIG. 8, FIG. 8 is an illustration of a city block 800 with many vehicles 102 and many pedestrians. Once first vehicle 802 sees three pedestrians gesturing to indicate that they are interested in receiving a transportation from the first vehicle 802. Pedestrian 804, pedestrian 806, and pedestrian 808 all indicate that they want a transportation. The first vehicle 802 can pick up one of the pedestrians 804 leaving pedestrian 806 and pedestrian 808.

The first vehicle 802 transmits the pedestrian information for pedestrian 806 and pedestrian 808 to other vehicles in the area. Vehicle 810, vehicle 812, and vehicle 814 receive the transmission from the first vehicle 802. The vehicle selection component 116 of vehicle 810, vehicle 812, and vehicle 814 determine that vehicle 810 will pick up pedestrian 808 and vehicle 812 will pick up pedestrian 806. The first vehicle 802 then signals to pedestrian 806 and pedestrian 808 that other vehicles are on the way to pick up the pedestrians.

Figure 9:
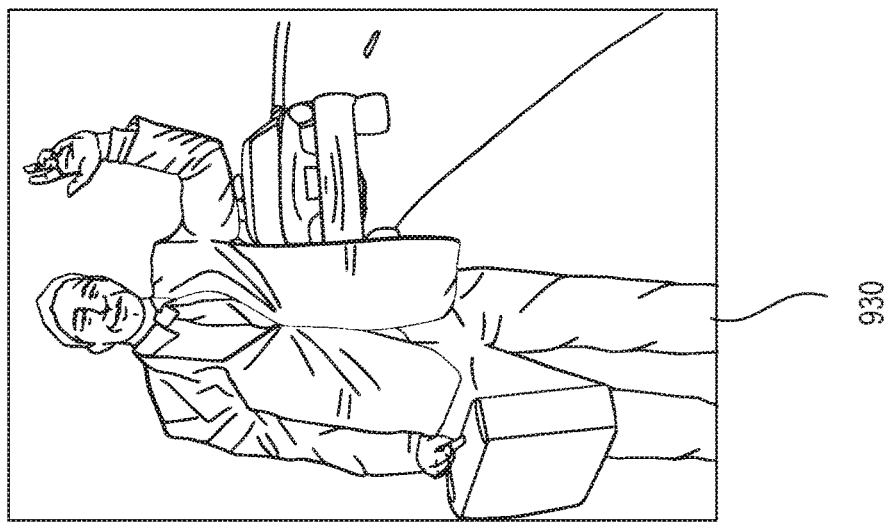
FIG. 9 illustrates possible hailing gestures of potential passengers.
Figure 9:
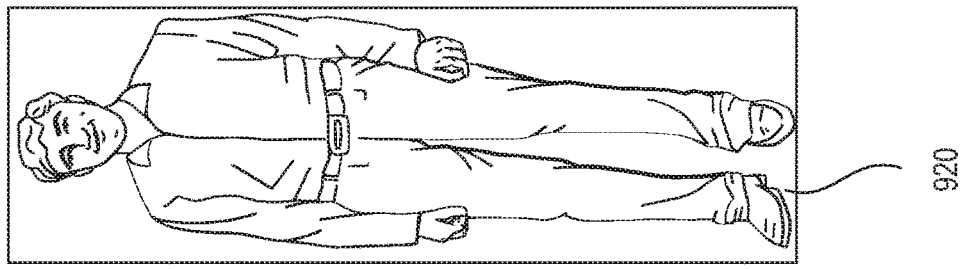
Figure 9:
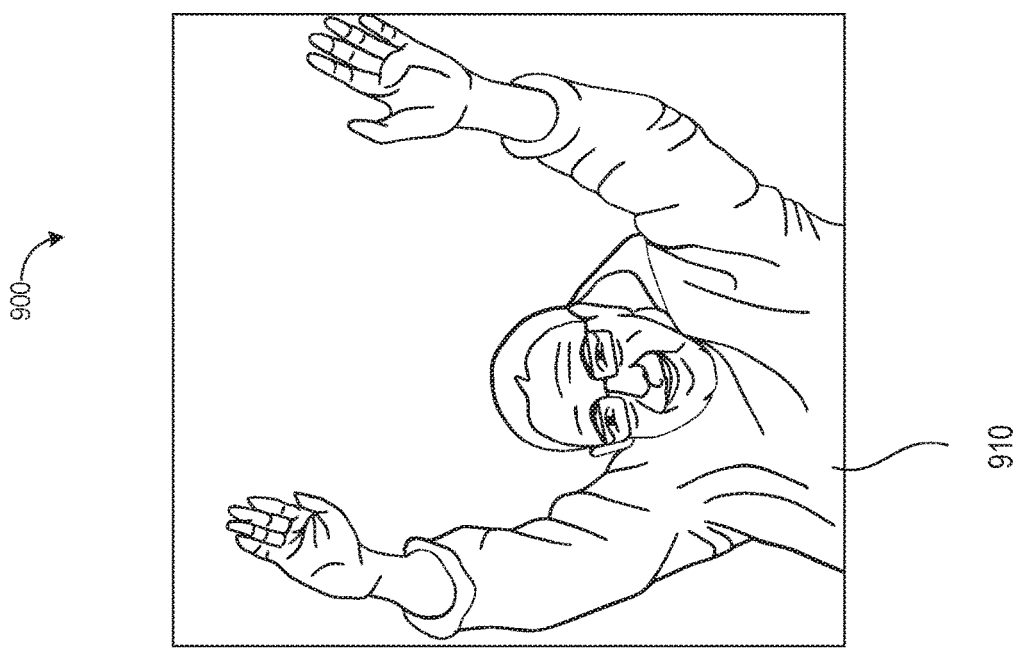

Referring to FIG. 9, FIG. 9 shows an illustration 900 of various pedestrian gestures that can indicate that an individual is interested in a transportation. Individual 910 is holding two hands in the air with both hands being open. The palms of the hands of individual 910 are facing outward 608. The distance from both hands to the waist 610 of individual 910 is the maximum value of requesting transportion. The three gesture variables: openness of hands 606, direction palm of hand is facing 608, and distance of hand from waist 610 strongly indicate that individual 910 is interested in receiving transportation. Other variables that may be factored by a gesture recognition component 114 might be the direction the individual is looking or the location the individual is standing at. A location close to the side of a road would be more indicative that the individual 910 is interested in a transportation while a location away from a road would be less indicative that the individual 910 is interested in receiving a transportation.

In one embodiment, the individual may indicate the type of vehicle 102 that the individual is interested in receiving a transportation from. Holding up two hands in the air, such as individual 910 is doing, can indicate that individual 910 is interested in a different vehicle 102 than holding one hand in the air. For example, holding two hands in the air can indicate that the individual is interested in a vehicle 102 that is a luxury automobile that may have leather interior or cost above a threshold value.

Individual 920 is standing with hands and arms at the side of the individual 920. This tends to indicate that the individual 920 is not interested in receiving transportation. The gesture recognition component 114 may determine that individual 920 does not desire a ride. However, the determination would change if the individual 920 were standing in this position at the side of a road on a curb looking attentively at a vehicle 102.

Individual 930 is standing with the universal gesture for hailing a vehicle 102. The hand of the individual 930 is up in the air and/or above his head. The palm of the hand of the individual 930 is open as determined by the openness of the hands 606 and facing outward 608. All gesture variables 602 indicate that the individual 930 is interested in receiving a transportation.

Figure 10:
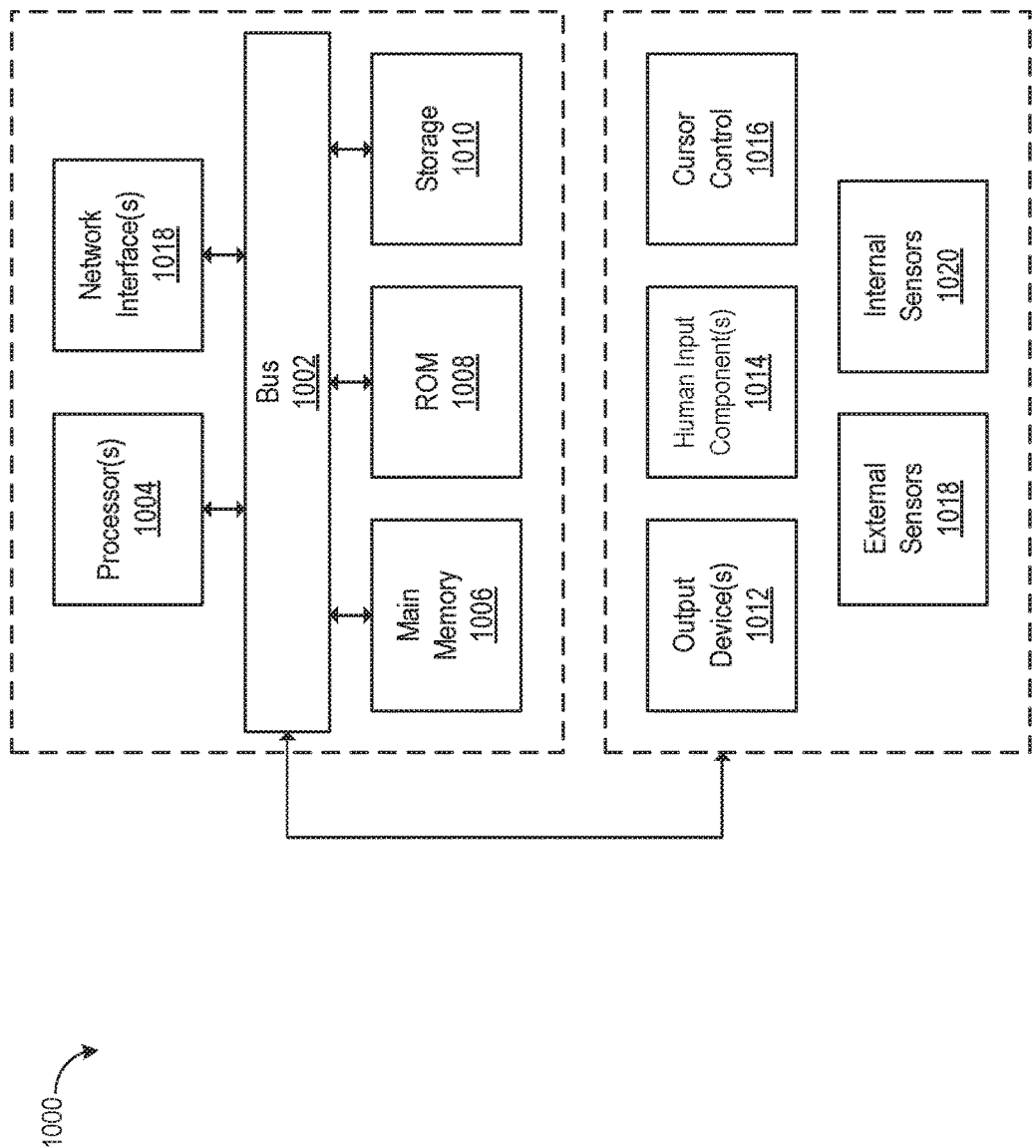
FIG. 10 is a schematic illustrating the computing components that may be used to implement various features of the embodiments described in the present disclosure.

FIG. 10 is a block diagram that illustrates a computer system 1000 upon which any embodiments of the vehicle computer 106 may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. The external sensors 1020 of the vehicle may be coupled to the bus to communicate information on the environment outside the vehicle 102. Similarly, the internal sensors 1022 may be coupled to the bus to communicate information on the passenger(s) inside the vehicle 102. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and maybe originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a component control. A component control local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieve and execute the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable component control, satellite component control, or a component control to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution. Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the embodiments should, therefore, be construed in accordance with the appended claims and any equivalents thereof.

The various operations of example methods described herein may be performed, at least partially, by one or more processors that are temporarily configured (e.g., by software) or permanently configured to perform the relevant operations. Similarly, the methods described herein may be at least partially processor-implemented, with a particular processor or processors being an example of hardware. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine but deployed across a number of machines. In some example embodiments, the processors may be located in a single geographic location (e.g., within a home environment, an office environment, or a server farm). In other example embodiments, the processors may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for providing transportation, the method comprising:
   identifying, by one or more sensors of a vehicle, an entity to potentially provide transportation, the one or more sensors comprising any of a LiDAR, a camera, a radar, and an ultrasonic sensor;
   detecting, by a computer shared between the vehicle and an other vehicle, whether the entity is gesturing towards the vehicle based on:
      a direction of eyes,
      a degree of openness of hands,
      a direction of palms, and
      a distance between the hands and a waist of the entity;
   determining, by the computer, to transmit information regarding the entity to the other vehicle in response to detecting that the entity is gesturing towards the vehicle; and
   in response to determining to transmit information regarding the entity to the other vehicle, transmitting the information regarding the entity to the other vehicle so that the other vehicle navigates towards the entity.

2. The method of claim 1, wherein the vehicle comprises a first vehicle, and the method further comprises:
informing the entity, by the first vehicle, that a second vehicle is on its way by providing an estimated time to the entity.

3. The method of claim 1, wherein identifying the entity comprises receiving a hailing communication from the entity; the method further comprising:
determining a destination responsive to receiving input from the entity; and
further comprising operating the vehicle autonomously to the destination.

4. The method of claim 3, wherein the hailing communication by the entity further comprises at least one of a physical gesture, a voice communication, or standing on a curb.

5. The method of claim 3, wherein the hailing communication indicates a type of vehicle that the entity is requesting.

6. The method of claim 3, further comprising:
identifying a payment account of the entity based on the identity of the entity; and
charging the payment account for the transportation of the entity.

7. The method of claim 6, further comprising authenticating the entity for the payment account by receiving biometric information from the entity.

8. The method of claim 1, wherein the information regarding the entity comprises a length of hair and a type of watch worn by the entity.

9. The method of claim 1, wherein the degree of openness of the hands comprises a degree to which fingers of the hands of the entity are clenched into a fist.

10. The method of claim 1, wherein the information regarding the entity comprises a number of other entities associated with the entity, as determined by detecting communication among the entity and the other entities.

11. The method of claim 1, wherein, the detecting whether the entity is gesturing towards the vehicle is based on an angle between an arm and a direction of travel of the vehicle.

12. The method of claim 11, wherein, the detecting whether the entity is gesturing towards the vehicle is based on a perpendicular angle between the arm and the direction of travel of the vehicle.

13. The method of claim 1, further comprising:
detecting, by the computer, that the entity is requesting a different type of vehicle compared to the vehicle based on the entity holding two hands up.

14. An apparatus for providing transportation, the apparatus comprising:
one or more sensors comprising any of a LiDAR, a camera, a radar, and an ultrasonic sensor, the one or more sensors configured to identify an entity to potentially provide transportation; and
one or more processors shared between the vehicle and an other vehicle and configured to:
detect whether the entity is gesturing towards the vehicle based on:
a direction of eyes,
a degree of openness of hands,
a direction of palms, and
a distance between the hands and a waist of the entity; and
determine to transmit information regarding the entity to an other vehicle in response to detecting that the entity is gesturing towards the vehicle; and
in response to determining to transmit information regarding the entity to the other vehicle, navigate the vehicle towards the entity or transmit the information regarding the entity to the other vehicle so that the other vehicle navigates towards the entity.

15. The apparatus of claim 14, wherein the sensor that identified the entity is located on the vehicle;
wherein the vehicle is configured to inform the entity that the other vehicle is on its way by providing an estimated time to the entity.

16. The apparatus of claim 14, wherein identifying the entity comprises receiving a hailing communication from the entity;
wherein the vehicle is further configured to determine a destination responsive to receiving input from the entity and operate autonomously to the destination.

17. The apparatus of claim 16, wherein the hailing communication comprises at least one of a physical gesture, a voice communication, or standing on a curb.

18. The apparatus of claim 16, wherein the hailing communication indicates a type of vehicle that the entity is interested in.

19. The apparatus of claim 16, wherein the vehicle is further configured to identify a payment account of the entity based on an identity of the entity and charge the payment account for the transportation of the entity.

20. A non-transitory computer readable storage medium in a vehicle having data stored therein representing software executable by a computer, the software comprising instructions that, when executed, cause the vehicle to perform:
identifying, by one or more sensors of a vehicle, an entity to potentially provide transportation, the one or more sensors comprising any of a LiDAR, a camera, a radar, and an ultrasonic sensor;
detecting, by a computer shared between the vehicle and an other vehicle, whether the entity is gesturing towards the vehicle based on:
a direction of eyes,
a degree of openness of hands,
a direction of palms, and
a distance between the hands and a waist of the entity;
determining, by the computer, to transmit information regarding the entity to the other vehicle in response to detecting that the entity is gesturing towards the vehicle; and
in response to determining to transmit information regarding the entity to the other vehicle, transmitting the information regarding the entity to the other vehicle so that the other vehicle navigates towards the entity.

* * * * *